(12) United States Patent
Hendrickson et al.

(10) Patent No.: US 8,931,209 B2
(45) Date of Patent: *Jan. 13, 2015

(54) SEED-DELIVERED, SOIL-AMENDMENT METHOD AND COMPOSITION

(75) Inventors: Calder Hendrickson, Lubbock, TX (US); Todd Naff, Lubbock, TX (US)

(73) Assignee: Aquasmart Enterprises, LLC, Lubbock, TX (US)

( * ) Notice: Subject to any disclaimer, the term of this patent is extended or adjusted under 35 U.S.C. 154(b) by 43 days.

This patent is subject to a terminal disclaimer.

(21) Appl. No.: 13/599,735

(22) Filed: Aug. 30, 2012

(65) Prior Publication Data

US 2013/0005569 A1 Jan. 3, 2013

Related U.S. Application Data

(63) Continuation-in-part of application No. 12/913,662, filed on Oct. 27, 2010, now Pat. No. 8,453,377, and a continuation-in-part of application No. 13/484,482, filed on May 31, 2012, now Pat. No. 8,739,464, which is a continuation of application No. 12/565,452, filed on Sep. 23, 2009, now Pat. No. 8,196,346, application No. 13/599,735, which is a continuation-in-part of application No. 12/789,177, filed on May 27, 2010, now Pat. No. 8,341,881, which is a continuation of application No. 12/324,608, filed on Nov. 26, 2008, now Pat. No. 7,726,070.

(60) Provisional application No. 61/531,042, filed on Sep. 5, 2011, provisional application No. 61/099,852, filed on Sep. 24, 2008, provisional application No. 61/012,912, filed on Dec. 11, 2007.

(51) Int. Cl.
*A01G 1/00* (2006.01)
*A01C 1/06* (2006.01)
*C09K 17/22* (2006.01)

(52) U.S. Cl.
CPC ............... *A01G 1/001* (2013.01); *C09K 17/22* (2013.01); *A01C 1/06* (2013.01)
USPC .................................................. 47/58.1 SC

(58) Field of Classification Search
CPC ............. A01G 1/00; A01C 1/06; A01N 55/02
USPC .................................................. 47/58.1 SC
See application file for complete search history.

(56) References Cited

U.S. PATENT DOCUMENTS

| 2,690,388 | A | * | 9/1954 | Hale | 504/100 |
| 2,991,267 | A | | 4/1957 | Bean | |
| 2,967,789 | A | | 1/1961 | Hoyt | |
| 4,195,010 | A | | 3/1980 | Russell | |
| 4,247,331 | A | | 1/1981 | Hamlin | |

(Continued)

FOREIGN PATENT DOCUMENTS

WO WO8501736 * 4/1985

*Primary Examiner* — Monica Williams
(74) *Attorney, Agent, or Firm* — Pate Baird, PLLC

(57) ABSTRACT

A material for assisting in at least one of germination, protection, hydration, and thriving of seeds and the plants originating therefrom treats a seed with a tackifier or binder, such as corn syrup or the like, which secures a layer of hydrating polymer particles thereto. Nutrients, protectants, and the like may be absorbed in the polymer before or after coating of a seed thereby. Weighting materials, extenders, flowing agents, and the like may assist in the functioning or handling of the coated seeds.

19 Claims, 4 Drawing Sheets

(56) References Cited

U.S. PATENT DOCUMENTS

| | | | |
|---|---|---|---|
| 8,196,346 B2* | 6/2012 | Thrash | 47/58.1 SC |
| 8,341,881 B2* | 1/2013 | Thrash | 47/59 S |
| 8,510,986 B2* | 8/2013 | Thrash | 47/58.1 SC |
| 2013/0005569 A1* | 1/2013 | Hendrickson et al. | 504/101 |

* cited by examiner

SEED-DELIVERED, SOIL-AMENDMENT METHOD AND COMPOSITION

RELATED APPLICATIONS

This application: claims the benefit of U.S. Provisional Patent Application Ser. No. 61/531,042, filed on Sep. 5, 2011; is a continuation in part of co-pending U.S. patent application Ser. No. 12/913,662, filed Oct. 27, 2010; is a continuation in part of co-pending U.S. patent application Ser. No. 13/484,482, filed May 31, 2012 which is a continuation of U.S. patent application Ser. No. 12/565,452, filed Sep. 23, 2009, issued Jun. 12, 2012 as U.S. Pat. No. 8,196,346, which claims the benefit of U.S. Provisional Patent Application Ser. No. 61/099,852, filed Sep. 24, 2008; is a continuation in part of co-pending U.S. patent application Ser. No. 12/789,177, filed May 27, 2010, which is a continuation of U.S. patent application Ser. No. 12/324,608, filed Nov. 26, 2008, issued Jun. 1, 2010 as U.S. Pat. No. 7,726,070, which claims the benefit of U.S. Provisional Patent Application Ser. No. 61/012,912, filed Dec. 11, 2007; all of which are hereby incorporated by reference.

BACKGROUND

1. The Field of the Invention

This invention relates to horticulture and, more particularly, to novel systems and methods for amending soil beds by delivering materials thereinto for improving hydration, germination, growth, pest resistance, and disease resistance of seeds and plants.

2. The Background Art

Different types of soils perform their functions differently. In particular, rocky soils, sandy soils and the like tend to pass water too freely. Likewise clay soils tend to hold water, but yet not permit the water to distribute therethroughout. Typically, organic soils having substantial amounts of loam formed by organic matter such as leaves, other foliage, decaying plant matter, and the like provide better absorption and holding of water.

In general, soil may be improved on a small scale by addition of organic matter such as peat moss. On a large scale, soils are typically improved by growing and plowing under certain plants selected for their addition of organic matter. Likewise, waste materials from corrals, grain stalks (straw) and the like may be plowed into tracts of land in order to improve their organic content and their capacity to hold water for use by plants.

Gelatin is a naturally occurring polymer. Gelatin binds with water to form a "gel." The existence of naturally occurring polymers such as gelatin has been augmented by the development of synthetic polymers. One such polymer is polyacrylamide. Polyacrylamide (PAM) and other similar gels have been used for different types of binding processes. For example, a gel, when wet, may be easily formed, and when dry may become something of a glue or binder. Likewise, gels typically are formed of long polymers and thus are often durable in the face of erosive actions such as water running over them. Accordingly, gels such as PAM have been used to treat surfaces of ground in order to minimize erosion by the passing of water thereover.

Horticulture is the culture of plants. Plants rely on water as a transport mechanism in order to draw nutrients from the ground into the plants through the roots and into the stems, leaves, and so forth. Likewise, water acts as a transpiration cooling mechanism by evaporation out through the leaves and other foliage of a plant.

Thus, the health of plants depends upon access to water, nutrients, protective chemicals such as pesticides and protectants (pathogencides). Many parts of the United States, and even indoor plant locations such as malls, homes, offices, and the like receive little or no rainfall. Irrigation or periodic watering by some mechanism is often required. In such situations, plants may dwell for an extended period without additional water. Organic soils improve the water holding capacity around such plants. Nevertheless, evaporation and periodic watering may still combine to put stress on plants. Moreover, horticulture and agriculture on any large scale may have similar problems inhibiting germination, growth, or thriving of seeds and plants.

It would be an advance in the art to provide a mechanism whereby to automatically deliver and store within a soil, such as near a seed or plant root, a mechanism to absorb, carry, hold, and deliver water, nutrients (fertilizers), protectants (pathogencides), and other soil amendments. It would be an advance to release these materials in a region of greatest utility and over time while resisting loss, evaporation, migration away, and the like. Other applications have needs as well.

Seeding, or sowing seed, may be done by hand or by machine. Typically, seed may be dropped from a drop spreader or actually placed underground a selected distance by a grain drill. Seed may be broadcast through the air to land on the surface of the ground.

Some seed has a comparatively larger granular size, some smaller. Some seed may have a comparatively greater density (mass per unit volume), specific weight (weight per unit volume), or specific gravity (density compared to that of water). Others may have comparatively lesser values of such. As one of such measurements goes, so go all the others, so the term density will be used herein to represent the performance for all the above.

Seeds of comparatively smaller sizes and lower densities tend to drift with the air more easily, rather than passing through it. Likewise, such are more likely to float or drift with water from rainfall or irrigation, for the same reason. The transfer of momentum from passing fluids (air, water) to the seed tends to drag the seed with the fluid. Thus, air and water can interfere with feed, flow, distribution, permanence, and settling into the soil. Smaller and lighter seeds will tend to clog in conduits, move poorly through the air when broadcast or dropped, float away with rain or other water sources, and not sink down into moist or fully hydrated (muddy) soil readily.

Meanwhile, watering schedules, rain, sunshine, and other weather, with their consequent soil moisture, soil warmth, light, and air temperature may vary greatly over any period of days during a planting season. Likewise, soils and seeds may vary so dramatically, that any or all the foregoing conditions may produce very different results for various types of seeds placed on or in varying soils.

It would be an advance in the art to provide a process or method of delivering soil amendments into soils, near seeds or roots to be most effective. It would be a further advance to use seeds themselves as a delivery vehicle, such as by temporarily coating a supply of seed to make distribution more consistent, concentrated, and controlled over greater distances and areas. Such amendments may improve settling into the soil, resist carriage away with water or wind, improve germination, water retention, and growth, and even optionally resist disease (e.g., by pathogens such as microbes, bacteria, viruses, etc.), pests, and the like. Amendments that may separate from their delivery vehicle (substrate, particle, seed, etc.) may still release chemical constituents over time very near the carrier substrate (e.g., sand, seed) or its resulting root to be especially efficient and effective by such targeting.

BRIEF SUMMARY OF THE INVENTION

In view of the foregoing, in accordance with the invention as embodied and broadly described herein, a method and composition are shown for amending soil. In one embodiment of the composition, a granular substrate is coated with a binder, hydrating agent, and a nutrient or protectant. One embodiment of the method in the present invention involves coating a granular substrate with a binder and a powdered soil amendment, then distributing (e.g. sowing, planting) the coated substrates (e.g. sand, seed). In certain embodiments, such as where a potted plant may have a transparent vessel or pot in which it is held, pigment may be added to the polymer, to the binder, or to the surface of the substrate by any suitable mechanism. Thus, the hydration maintenance material may be configured as a decorative or identifying element on its own or for a potted plant, for example.

One organic substrate is seed itself. However, seed tends to be distributed more sparsely than, for example, a conventional broadcast or tilled-in soil amendment. This permits very targeted amendments, at increased concentration, yet more sparse distribution. In selected embodiments of compositions, apparatus, and methods in accordance with the invention, seed may be coated to add several functional features. For example, seed may serve as an organic substrate, coated to provide a water retaining polymer on a surface of the seed. Granules of a hydrophilic polymer may be secured to a seed by a tackifier or other similar binder.

Various protectants (e.g. biocides, pathogencides, pesticides, herbicides) hydration aids, nutrients, and combinations thereof may be added as all or some of the powder bonded by a binder to a seed or other substrate. On the other hand, any protectant or nutrient that may be mixed or dissolved into the hydration aid may be distributed therewith. In certain embodiments, the material of the powder may, sooner or later, separate from attachment to the substrate (e.g., sand, seed, etc.) and slowly release (e.g., leach, dissolve, etc.) protectants, nutrients, or both into the nearby soil in proximity to the seed or root needing the benefit thereof.

For comparatively light seeds, having a relatively large projected area exposed to passing fluids (e.g., air, water) a weighting agent may also be included in a coating on the surface of a seed. Materials may be extended by "fillers" or in other words "extenders." Dry flow agents may be applied to the surface of coated seeds to reduce or eliminate any tendency to adhere to one another. Also, a hydrophobic material in the coating, applied after the principal coating, or dusted on thereafter my resist access to the seed by liquid water. This tends to resist fungus, while still permitting moisture in the form of water vapor to contact the seed and promote germination.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 1:
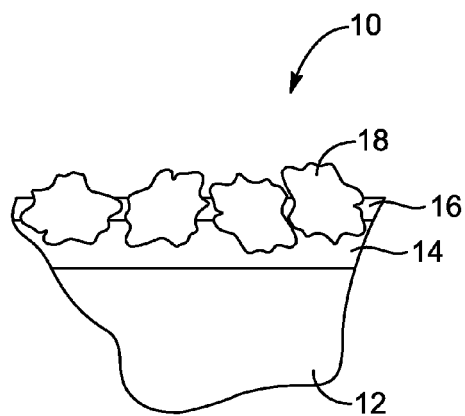
FIG. 1 is a schematic cross-sectional view of a material including a substrate provided with a binder securing a hydrating polymer thereto in accordance with the invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, a material 10 in accordance with the invention may include a substrate 12 formed of a suitable material for placement in the vicinity of a root system of a plant. For example, a substrate may be a particle of sand. In certain embodiments, even gravel or rock in a potting environment may operate as a substrate. In some embodiments, a substrate may be formed of organic or inorganic material. A substrate may be a fertilizer granule, seed, or other object placed or found in or on a bed of soil.

Sand as a substrate 12 is submersible in water and will not float as many organic materials will when dry. Likewise, the sand as substrate 12 is comminuted to such a small size that interstices between individual grains of the sand substrate 12 provide ample space and minimum distance for water to surround each of the substrate 12 particles.

On the other hand, material 10 is placed exactly where needed when seed is the substrate 12. Seeds need fertilizers and pesticides and other supplements to grow, but excess amount of these supplements can be detrimental to the environment. Using the seed as substrate allows for reduced use of these supplements. Moreover, the seed's size, shape, density, and other characteristics can be manipulated by coating the seed.

In the illustrated embodiment, a binder 14 may be distributed as a comparatively thin layer on the surface of the substrate 12. Typical materials for binders may include both temporary and permanent binders 14. Temporary binders may be sugar-based or other water soluble materials. For example, corn syrup, molasses, and the like may form temporary binders. In the presence of water, such material may ultimately dissolve. Nevertheless, so long as the substrate 12 is not turned, mixed, or otherwise disturbed excessively, any other materials supported by the binder 14 would not be expected to dislocate.

Otherwise, certain naturally or synthetically occurring polymers may also be used as a binder 14. Lignicite may be used as a binder 14. Lignicite is a byproduct of wood, and provides material having comparatively good adhesive properties, and substantial permanence as a binder 14 on a substrate 12.

Other polymers may be used to form a binder 14. For example, various materials used as glues, including mucilage, gelatin, other water soluble polymers, including, for example, Elmer's™ glue, and the like may also operate as binders 14 to bind materials to a substrate 12.

In certain embodiments, the substrate 12 may be used in soils in outdoor environments. In other situations, the substrate 12 may be implemented in indoor pots and planters. In other embodiments, the substrate 12 may be used as a filler material in planters or pots having transparent or translucent walls. In such embodiments, a pigment 16 may be added. Likewise, even if the substrate 12 and its contents bound thereto by the binder 14 are not to be seen, they may be pigmented with an appropriate pigment 16 simply for the purpose of identification during selection, scale, or installation. Accordingly, a pigment 16 may be provided.

The pigment 16 may be implemented in any of several manners. For example, the substrate 12 may have pigment 16 applied prior to the application of the binder 14. In alternative embodiments, the pigment 16 may actually be included in the binder 14, which becomes a pigmented coating on the substrate 12. In yet other embodiments, the pigments 16 may be added to a hydration particle 18 either as a pigment 16 mixed therein, or as a pigment 16 applied as a coating thereto. Thus the location of the pigment 16 in the Figures is schematic and may take alternative location or application method.

Particles 18 of a hydrophilic material may be bonded to the substrate 12 by the binder 14. Particles may be sized to substantially coat or periodically coat the substrate 12 with certain polymers 18, water may serve as a binder by softening the polymer, rendering it sufficiently tacky to adhere to a substrate 12.

In certain embodiments, the hydrophilic material 18 may be a powdered polymeric material 18 such as polyacrylamide. In other embodiments, the particles 18 may actually be organic material having capillary action to readily absorb and hold water. In one presently contemplated embodiment of an apparatus in accordance with the invention, the particles 18 may be powdered polymeric material in a dehydrated state, and having a capacity to absorb water, typically many times the weight of a particular particle 18.

The substrate 12, in certain embodiments, may be sand. The sand will typically be cleaned and washed to remove dust and organic material that may inhibit the binder 14 from being effective. Likewise, the substrate 12 may be sized of any suitable size. For example, sand particles may range from much less than a millimeter in effective diameter or distance thereacross to approximately two millimeters across. Very coarse sands may have even larger effective diameters. Likewise, in certain embodiments, gravel of various sizes may operate as a substrate 12. However in one presently contemplated embodiment, washed and dried sand such as is used in construction, such as in concrete, has been found to be suitable. Fine sands such as masonry sands tend to be smaller, and also can function suitably in accordance with the invention.

Accordingly, the distance across each particle 18 may be selected to provide an effective coating (e.g. dusting) of powdered particles 18 on the substrate 12. In one presently contemplated embodiment, the effective diameter of the particles 18 may be from about a 30 mesh size to about a 100 mesh size. For example, a sieve system for classifying particles has various mesh sizes. A size of about 30 mesh, able to pass through a 30 mesh sieve, (i.e., about 0.6 mm) has been found suitable. Likewise, powdering the particles 18 to a size sufficiently small to pass through a 100 mesh (i.e., about 0.015 mm) sieve is also satisfactory. A mesh size of from about 50 mesh to about 75 mesh is an appropriate material to obtain excellent adhesion of particles 18 in the binder 14, with a suitable size of the particles 18 to absorb significant liquid at the surface of the substrate 12.

As a practical matter, about half the volume of a container containing a substrate 12 as particulate matter will be space, interstices between the granules of the substrate 12. One advantage of using materials such as sand as the substrate 12 is that a coating of the particles 18 may provide a substantial volume of water once the particles 18 are fully saturated. By contrast, where the size of the particles 18 is too many orders of magnitude smaller than the effective diameter or size of the substrate particles 12, less of the space between the substrate particles 12 is effectively used for storing water. Thus, sand as a substrate 12 coated by particles 18 of a hydrophilic material such as a polymer will provide substantial space between the substrate particles 12 to hold water-laden particles 18.

The diameter of the particles 18, or the effective diameter thereof, is typically within about an order of magnitude (e.g., 10×) smaller than the effective diameter of the particles of the substrate 12. This order of magnitude may be changed. For example, the order of magnitude difference less than about 1 order of magnitude (i.e., 10×) may still be effective. Similarly, an order of magnitude difference of 2 (i.e., 100×) may also function.

However, with particles 18 too much smaller than an order of magnitude smaller than the effective diameter of the substrate 12, the interstitial space may not be as effectively used. Likewise, with an effective diameter of particles 18 near or larger than about 1 order of magnitude smaller than the size of the particles of the substrate 12, binding may be less effective and the particles 18 may interfere more with the substrate itself as well as the flow of water through the interstitial spaces needed in order to properly hydrate a material 10.

Figure 2:
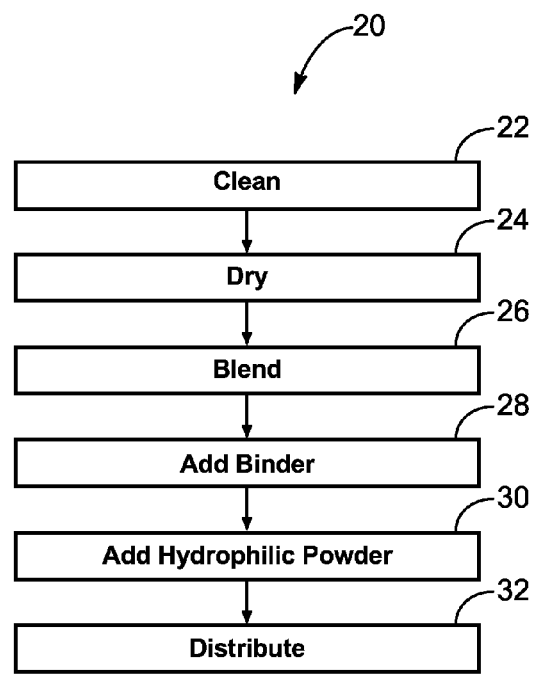
FIG. 2 is a schematic block diagram of one embodiment of a process for formulating and producing a hydrating material in accordance with the invention.

Referring to FIG. 2, an embodiment of a process for formulating the material 10 may involve cleaning 22 the material of the substrate 12. Likewise, the material of the substrate 12 may be dried 24 to make it more effective in receiving a binder 14. The material of the substrate 12 may then be blended 26.

In one embodiment, a ribbon blender provides an effective mechanism to perform continuous blending as the binder 14 is added 28. Other types of mixers, such as rotary mixers, and the like may be used. However, a ribbon blender provides a blending 26 that is effective to distribute binder 14 as it is added 28.

For example, if an individual particle of the substrate 12 receives too much binder 14, and thus begins to agglomerate with other particles of the substrate 12, a ribbon binder will tend to separate the particles as a natural consequences of its shearing and drawing action during blending 26.

As the binder 14 is added 28 to the mixture being blended 26, the individual particles of the substrate 12 will be substantially evenly coated. At this stage, the binder 14 may also be heated in order to reduce its viscosity and improve blending. Likewise, the material of the substrate 12 or the environment of the blending 26 may be heated in order to improve the evenness of the distribution of the binder 14 on the surfaces of the substrate 12 materials or particles 12.

Blending 26 of the binder 14 into the material of the substrate 12 is complete when coating is substantially even, and the texture of the material 10 has an ability to clump, yet is easily crumbled and broken into individual particles. At that point, addition 30 of the hydrophilic particles 18 may be accomplished.

For example, adding 30 the particles 18 as a powder into the blending 26 is a naturally stable process. Typically the particles 18 attach to the binder 14 of the substrate 12 particles, thus removing from activity that location. Accordingly, other particles 18 rather than agglomerating with their own type of material will continue to tumble in the blending 26 until exposed to a suitable location of binder 14 of the substrate 12. Thus, the adding 30 of the particles 18 or powder 18 of hydrophilic material will tend to be a naturally stable process providing a substantially even coating on all the particles of the substrate 12.

Just as marshmallows are dusted with corn starch, rendering them no longer tacky with respect to one another, the material 10 formulated by the process 20 are dusted with particles 18 and will pour freely. Accordingly, distribution 32 may be conducted in a variety of ways and may include one or several processes. For example, distribution may include marketing distribution from packaging after completion of blending 26, shipping to distributers and retailers, and purchase and application by users.

An important part of distribution 32 is the deployment of the material 10 around the roots of a plant. In one embodiment of an apparatus and method in accordance with the invention, the material 10 may be poured, as if it were simply sand 12 or other substrate 12 alone. Since the powder 18 or particles 18 have substantially occupied the binder 14, the material 10 will not bind to itself, but will readily pour as the initial substrate material 12 will.

Figure 3:
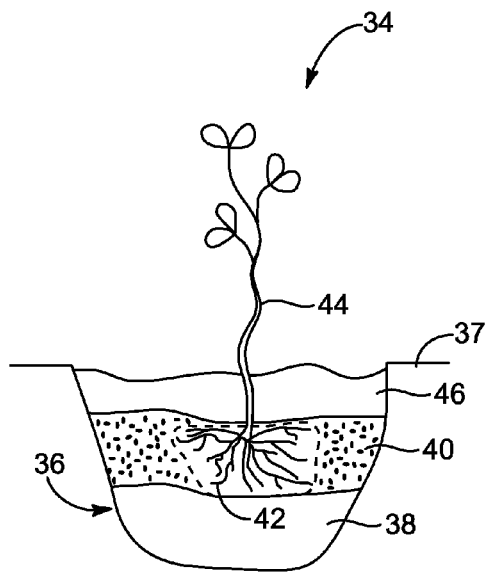
FIG. 3 is a cross-sectional view of one embodiment of one installation of a hydrating material in accordance with FIGS. 1 and 2 implemented to service a plant as a hydrating layer.

Referring to FIG. 3, in one embodiment of an installation 34, distribution 32 may include pouring a layer of the material 10 near a plant. In the illustration of FIG. 3, the process 34 or installation 34 may include a cavity 36 formed in the ground, or by a container such as a pot, planter, or the like. In the illustrated embodiment, the cavity 36 may have a surrounding environment 37 such as the ground. A potting mixture 38 or potting soil 38 may fill a portion of the cavity 36.

For example, one conventional mixture of horticulturists may include a mixture of peat moss or compost along with other drainage materials. For example, gravel, sand, vermiculite, perlite, or the like may be mixed with an organic material such as peat moss or compost in order to provide drainage in addition to the moisture capacity of the organic material.

The material 10 in accordance with the invention may be disposed in a layer 40 poured around a rootball 42 of a plant 44. Accordingly, the layer 40 may provide to the rootball 42, or to individual roots a surrounding environment 40 having both ease of water transport or drainage through the substrate 12 (e.g., sand, etc.) while also having the particles 18 of hydrophilic material to absorb and maintain water within the interstitial spaces between the substrate 12 particles.

Thus, the layer 40 provides a reservoir within the cavity 36 of a material 10 engineered to maintain a high degree of hydration (e.g., water in a gel) that will not drain into the environment 37, nor be readily evaporated out. To this end, a top dressing 46 or a top layer 46 may be laid down on top of the layer 40 in order to provide some protection against evaporation from heat, sun, air, and the like. Thus, the top layer 46 may be formed of the same potting soil or other material of the layer 38 below the plant 44 and the rootball 42. Various suitable top layers 46 exist and are known in the horticulture arts.

For example, mulches, wood chips, synthetic materials, plastic sealing, and the like may be used as a covering layer 46. Inhibiting heat transfer and excessive access to air and heat may assist in reducing evaporation from the layer 40 of the material 10.

Figure 4:
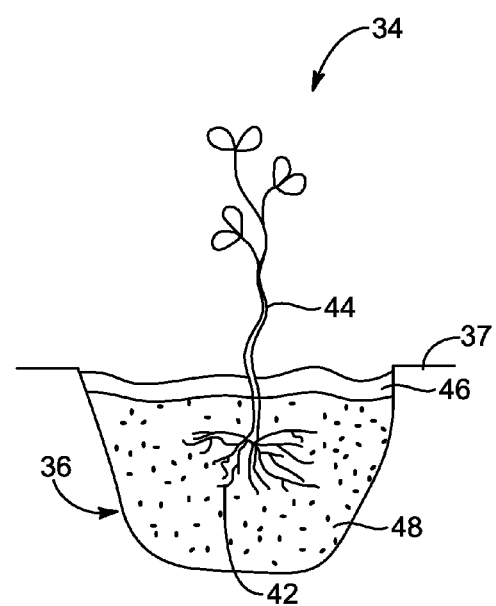
FIG. 4 is an alternative embodiment of an installation in accordance with the invention having the material of FIG. 1 distributed throughout a region surrounding a root system of a plant.

Referring to FIG. 4, an alternative embodiment of an installation 34 may include the cavity 36 and an environment 37 as discussed above. In the embodiment of FIG. 4, the rootball 42 may be surrounded by a distributed mixture 48 or fill 48 that includes the material 10 mixed into another potting soil mixture. For example, in the embodiment of FIG. 4, a potting soil mixture of any suitable combination of materials (e.g., selections from vermiculite, perlite, sand, peat moss, compost, soil, gravel, or the like) may be mixed with the material 10 throughout. A top layer 46 forming a suitable dressing to minimize evaporation from heat or wind may still serve well.

The material 10 may typically include from about 1 percent to about 20 percent of a hydrophilic material 18 or particles 18. The particles 18 may be formed of a naturally occurring material, such as a cellulose, gelatin, organic material, or the like.

In one embodiment, a synthetic gel, such as polyacrylamide may be used for the particles 18, in a ratio of from about 1 to about 20 percent particles 18 compared to the weight of the substrate 12. In experiments, a range of from about 5 to about 10 percent has been found to be the most effective for the amount of particles 18.

Sizes of particles 18 may range from about 20 mesh to smaller than 100 mesh. Particles 18 of from about 50 to about 75 mesh have been found most effective.

The binder 14 may typically be in the range of from about in ¼ percent to about 3 percent of the weight of the substrate 12. A range of from about ¾ percent to about 1½ percent has been found to work best. That is, with a binder such as lignicite, ¼ of 1 percent has been found not to provide as reliable binding of particles 18 to the substrate 12. Meanwhile, a ratio of higher than about 3 percent by weight of binder 14 to the amount of a substrate 12, such as sand, when using lignicite as the binder 14, tends to provide too much agglomeration. The pouring ability of the material 10 is inhibited as well as the blending 26, due to agglomeration. Other binders also operate, including several smaller molecules that are water soluble. For example, glues, gelatins, sugars, molasses, and the like may be used as a binder 14.

One substantial advantage for the material 10 in accordance with the present invention is that the material remains flowable as a sand-like material 10 into the area of roots and under a rootball or around the individual open roots of plants being transplanted. Thus, handling and application is simple, and the ability of granular material 10 to flow under and around small interstices between roots or between potting materials provides for a very effective application.

Certain experiments were conducted using the material 10 in accordance with the present invention. For example, in one experiment various sizes of planting pots were used ranging in size from one quart to one gallon, two gallons, and five gallons. Various plants were tested including geraniums, hibiscus, and Indian hawthorn.

In one experiment, a five gallon potting container was half filled with a potting soil mixture of conventional type. Approximately one liter of the material 10 was added as a layer on top of the potting soil. Three geraniums plants where then planted in the material 10. And the remainder of the pot was filled with a potting soil mixture.

The pot was placed where it could drain and was watered liberally with the excess water running out of the drainage apertures in the pot. Four such pots were set up, each having three geranium plants. Four additional pots were set up without using material 10 in a layer 40 around the roots of the plants. All plants were planted and all pots were prepared on the same day. The same amount of water was applied to each of the pots.

After 10 days, the untreated plants lacking the material 10 in the extra layer 40 of the material 10 to hold the water appeared to be extremely stressed. In fact, the plants stressed sufficiently that after 15 days they appeared dead.

Plants potted in the layer 40 of the hydrated material 10 still appeared healthy after 10 days and after 15 days. At 35 days after watering, the plants in the treated pots containing the layer 40 of hydrating material 10 began to appear stressed. Upon watering, they responded well and returned to full hydration and health. The plants in the untreated pots did not recover.

Another test used hibiscus plants with four pots treated with the layer 40 of a hydrating material 10 and four pots untreated. All pots were the same size. The watering process was the same. Thus, as with the geranium experiment, all pots were watered equally.

After 15 days the hibiscus plants that had not been treated with the extra layer 40 of the hydrating material 10 appeared very stressed. After 20 days, the plants in the untreated plots were turning brown.

In contrast, hibiscus plants in the treated pots having an extra layer 40 of hydrating material 10 appeared healthy after 15 days and even out to 22 days, when the hibiscus plants in the untreated plots were in the browning stages of dying.

After 38 days, the hibiscus plants in the treated pots began to show stress. Water was provided to plants at 38 days. The untreated pots were watered the same as the treated pots. Plants in the untreated pots did not respond. The plants in the treated pots responded well and continued living healthily upon the watering at 38 days.

In one experiment, an Indian hawthorn was planted in the ground. About a liter of the material 10 was laid about the roots in a layer 40 as described hereinabove. In this instance, the experiment was conducted in an environment of natural ground. The Indian hawthorn plants were placed in holes approximately 18 inches across by about 15 inches deep. In each instance, the hole 36 prepared for the plant was partially filled with a soil and wetted. Two plants were placed in holes treated with approximately 1 liter of the material 10, each. A control was created by planting two additional Indian hawthorns using each step the same, in preparation of the hole, placement of the soil in the hole, and watering of the soil and the plants. In the control, none of the material 10 was used.

No further water was applied. After 20 days, the untreated shrubs appeared to be dry with some stress. After 33 days, the plants in the untreated holes were dead. Meanwhile, the treated shrubs remained healthy throughout.

In another experiment, the foregoing experiment was repeated using two additional Indian hawthorn plants and treating the soil with a layer 40 containing about 1½ liters of the hydrating materials 10 near the roots. In that experiment, after 20 days, the shrubs appeared healthy. At 33 days, the shrubs began to show a minimal amount of stress. At 40 days, the stressed plants were watered and responded well, returning to health and continued life.

In all of the foregoing experiment series, the particles 18 were of polyacrylamide, and the substrate 12 was sand. The polyacrylamide constituted approximately 5 percent by weight of the overall material 10. The particle size 18 was approximately a 60 mesh granularity.

In an alternative embodiment, seeds may be pre-coated. Such seeds may be used with or without additional soil treatments or amendments. Seeds for any embodiment may include grass seed, agricultural seed, vegetable seed, fruit seed, flower seed, or plant seed. Embodiments using grass seed include, inter alia, rye, fescue, bermuda, Kentucky bluegrass, and bentgrass seed.

Embodiments using agricultural seeds include, among others, cotton, wheat, soybeans, corn, rice, barley, sugar cane, maize, potatoes, sugar beets, tomato, and milo. Embodiments using fruit or vegetable seed comprise artichoke, beans, broccoli, brussels, cabbage, carrot, cauliflower, cucumber, eggplant, lettuce, melon, onion, pea, peanut, pepper, pumpkin, raddish, spinach, and squash. Embodiments using flower seed comprise annual, perennial, cosmo, poppy, zinnia, and wildflower.

In certain applications, with or without the material 10 described hereinabove being placed in the soil, many of the foregoing benefits and others accrue by using as an organic substrate 12 seeds 12 to be sown, germinated, and grown. For example, in an alternative embodiment of a material, apparatus, and method in accordance with the invention, seeds 12 may be the substrate 12 be coated by the particles 18 and other materials to improve their germination, growth rate, and resistance to the stress of infrequent or inconsistent watering. Multiple materials are used to coat the seed substrate 12 to improve distribution, placement, moisture control.

The water-retaining element may be a polymer, such as a synthetic polymer. In one embodiment, the water retaining element by be a chemical composition such as polyacrylamide (PAM) or polyacrylate. Herein, PAM will be used by way of example for any and all polymers that may serve the function of water retention. Coating may be accomplished in a continual (non-stop in time) flow process, a continuous (non-stop in space) flow process, or by both.

In one embodiment of a composition, method, and apparatus in accordance with the invention, seed 12 may be sown by a drill. Typically, a drill operates by placing the seed 12 through a small chute, dropping the seed 12 behind a small plow share forming a furrow. Discs or other implements following may often close the furrow over the seed 12. However, drills are usually used for grains and row crops. Such seeds 12 are typically heavier than some other seeds 12, such as grass seed 12. Also, drills place seed 12 in rows, resulting in a non-random seed 12 pattern and consequent plant pattern.

In other embodiments, seed 12 may be broadcast. Seed 12 may be dropped onto a rotating platen, provided with paddles, ribs, walls, or the like extending from the surface of the platen to act as impellers. The impellers assure that seed 12 is flung radially away from the platen in random directions and distributions.

In certain embodiments of a composition, apparatus, and method in accordance with the invention, a seed 12 coating process may create a slurry. The slurry may be composed of talc as a filler and flowing agent, sand as weight, water as a diluent and carrier, and a tackifier 14 for bonding solids to the seed 12.

The slurry is mixed with the seed 12 in a quantity sufficient to maintain flow in the mixer and to coat all the seed 12. This may be done in a stirring container with paddles or other agitators. In other embodiments, an auger may mix and transport the seed 12 in the slurry. The result is seed 12 particles tacky with the tackifier 14 and bonded thereby to the sand and talc.

More talc and granulated polymer particles 18 (water retaining polymer) are added to the tacky seed 12. The result is polymer granules 18 attached by the tackifier 14 to the seed 12. Talc, being much smaller, more like a dust or powder, coats much of the surface of the seed 12. The talc thus keeps the seed 12 more flowable and reduces the tendency of seeds 12 to stick together. This step adds more weight, and also helps dry out any residual wetness of the seeds 12.

Example 1

In this example, perennnial ryegrass was planted. A control planting or control sample used normal or conventional seed, commercially available and not treated in accordance with the invention. The other test groups contained seed 12 coated by one embodiment of a process in accordance with the invention. Coating ratios in the samples of coated seeds 12 were in three groups. One group had a 1% ratio, another had a 2% ratio, and another had a 5% ratio.

The seeds 12 in the various samples were treated the same, with periodic watering and consistent light. Photos were taken of the progress of the seeded plots of soil. Ryegrass has a very rapid germination. The difference in germination rate and time was not dramatic. Therefore no particular note was made of that difference between samples in this example test.

However, In an evaluation made 11 days after planting, plants were plucked up from each group, cleaned and compared. Stalk growth was improved in all the test samples over the control sample. The increased height exceeded that of the control by an amount of from about 40% to about 70%. Although the increased growth was pronounced between the treated and untreated samples, a statistical comparison to determine the relation of growth rate as a function of the coating ratio was not done in this test.

Root growth was likewise improved in all the test samples over the control sample. In all of the treated samples, the length of root growth was increased by an amount of from about 50% to about 100% over that of the control sample. Again, notwithstanding the pronounced increase in growth of the treated samples compared to the ntreated samples, a statistical comparison to determine the relation of growth rate as a function of the coating ratio was not done in this test. Likewise, in this example a statistical analysis of germination rates and stalk diameters and root numbers was not undertaken.

Example 2

In this observation, the samples were evaluated for their response to stress, induced by reduced watering. All the test samples show reduced stress, typically displayed as wilting and dehydration, compared to the stress of the untreated control sample. Moreover, not only did all the test samples improve over the control, but the resistance to stress improved with the increase in coating ratio as described in Example 1 above.

Example 3

In this test, a commercially available grass seed 12 mix sold by Pennington Seed was used. A control sample contained only the seed 12 mix as provided from the supplier. A test sample was coated by a process in accordance with the invention. The plants were observed after planting for 11 days. The differences in emergence were noted, and then a stress test began. For 5 days, the plants were not watered. At 16 days after planting the plants from coated seeds 12 remained robust, healthy, and vertical, rising tall above the potting soil mix.

The plants originating from the seeds 12 of the control sample were wilted down completely to lie on the potting soil. This degree of stress indicates such a low water level in the plant that survival is questionable, even with renewed watering. The test sample plants continued to thrive very well even without water for 5 days. The roots, reaped the benefit of the coating materials embedded in the soil around the roots. The coating materials, notwithstanding the germination and growth of the seeds 12, continued to absorb, store, and release moisture as the roots of the plant use it.

Example 4

In this embodiment, grass seed 12 may be coated by a mixture of materials. It may also be coated multiple times, each with a different material or combination of materials. Each addition of material changes the properties of the seed 12 and provides a different benefit.

In this embodiment, several functions must be accomplished. Moreover, the substrate of seed 12 (an organic substrate) as opposed to sand (inorganic substrate) makes several additional requirements necessary. The addition of weighting agents results in the PAM or other polymer particle 18 being better protected against dislodgement. Almost any seed 12 can benefit from a coating in accordance with the invention. However, grass seed, being comparatively very light, having a small thickess-to-width and small thickness to length aspect ratio, benefits particularly well.

In certain embodiments, ingredients included are grass seed 12 as the substrate, talc as a flowing agent and filler or extender, silica flour including one or more of calcium carbonate, clay, and powered iron to add weight, and corn syrup or other biodegradable material as a bonding agent 14, binder 14, or tackifier 14. Also, a water-retaining polymer particle 18 may be any suitable gelling agent in a granular form, such as polyacrylate or polyacrylamide (PAM).

Ingredients may be mixed as discussed above. After all other coatings are applied, the coated seed 12 may benefit from an additional step. The coated seed 12 may be mixed with fumed silica to render each seed 12 resistant to water. It has been found that, over time, seeds 12 will germinate even without exposure to liquid water. Germination occurs by reliance on water vapor. Thus, fumed silica does not interfere with germination. Also, the fumed silica coating adds to the particulate discretization of the seed, promoting flow when poured through machinery such as handling equipment, seeding implements, and so forth. Nevertheless, the fumed silica also protects against exposure to liquids that may cause disease or attacks by fungus. It also resists absorption of liquid water by the seed 12 during storage, transport, or handling.

Ranges of ingredients in the coating processes discussed above may be maintained within particular ranges in order to obtain the best performance from the seed 12. It has been found that the tackifier 14 performs best when the slurry relies on a liquid mixture of 50%-80% by weight of corn syrup or other organic, water soluble, liquid, biodegradable material is mixed with 50%-20% water by weight. The greater the proportion of corn syrup in the mix, the stronger the holding power or contact strength.

A single ratio does not work best with all seed 12 types. Because of the differing sizes, shapes, surface areas, densities, aspect ratios, and so forth of seeds 12, the tackifier 14 must serve as a complement to the properties and needs of the seed 12 type.

Talc and the weighting material (e.g., sand) are added to the tackifier 14 liquid, making it heavier and more viscous. The increase in viscosity of the tackifier 14 creates a thicker coating around each seed 12 giving greater bonding contact, bonding strength, and shear protection to the polymer particle 18 when it is added.

The water-absorbing polymer particle 18, precisely because of its aggressive absorption of moisture, tends to draw itself into the coating. This absorption speeds the apparent drying time, increase contact area, and secures granules 18 of the polymer particle 18 to the seed 12. The amount of tackifier 14 compared to the seed 12 is typically from about 5% to about 20% by weight.

Talc acts as a flowing agent when added to the seed 12 at the end of the coating process. This helps the seed 12 flow by separating one seed 12 from other seeds 12. The amount of talc used may vary with the seed 12 type. It has been found effective in some instances in amounts as low as about ½% by weight (of total weight) and as high as about 20%.

Talc used in the slurry as an extender helps because super absorbent polymer particles 18 are sensitive to moisture. Absorbing too much moisture can cause clumping or agglomeration of the particles 18 of polymer, the seeds 12 with respect to one another, or both. Thus, the moisture-to-polymer relationship is selected to be complementary.

Talc may be added to the supply of granules 18 or particles 18 of the polymer itself in order to dilute the absorption of water from the slurry, and to enable the polymer particles 18 to be spread out on each seed 12 and among the seeds 12. A ratio of from about 1:1 talc to polymer particle 18 to about 3:1 of talc to polymer particle 18 has been found effective.

Clay, sand, or the like may be used for weight. Many different materials can be used to add weight to the final product. Runoff water can carry seed 12 away or redistribute it. This problem with re-distribution may be reduced by increasing the final weight of each seed 12. Heavier seeds 12 sink in water. Heavier seeds 12 sink into wetted soils. Heavier seeds 12 fling further from broadcast spreaders. Heavier seeds 12 resist carrying away by wind.

Weighting materials also act as a protective barrier for the polymer granules 18. Situated beside polymer particles 18, bonded to the seed 12 by the tackifier 14, weighting materials tend to protect the position of polymer granules 18 in the corn syrup or other matrix. The foregoing coating process may therefore typically add an amount of weighting materials amounting to from about 3% to about 25% of the total weight of the coated seed 12 product.

The polymer granules 18 of polyacrylate, polyacrylamide, or the like are superabsorbent. By superabsorment is meant that they absorb multiple times their own weight in water. Increases in the water absorbing capability of a seed 12 results in many times more water near a seed 12. This greater holding ability of moisture offers a more consistent source of moisture to each seed, making it less susceptible to vagaries of weather, drought, infrequent watering, or other lack of water. In processes in accordance with the invention, a range of from about ¼% to to about 5% polymer by weight compared to seed 12 weight has been found suitable.

Timing appears to be very significant in some embodiments. If a coated seed 12 product completes the process too quickly, seeds 12 tend to clump together, and yet seed 12 coverage tends to be incomplete. This is at least partly due to the contact itself between seeds 12.

If the coated seed 12 product completes the process to slowly, the processing itself tends to strip the coating from many of the seeds 12. Thus, in most embodiments of apparatus and methods in accordance with the invention variable speed, quantity, and timing is provided for all operational controls. Thus, this variable control is exercised over all feeds, flows, speeds, times, and quantities in order to tune the process to the seed 12 and conditions at the time.

In some embodiments, each individual hopper of material of each type is placed on a rail system. Thus each hopper or feed system delivers its ingredient at exactly the time specified.

In summary then, the process places seed 12 in a hopper, charge cart, or the like, and then adds the tackifier 14, diluted according to the seed 12 being coated. Weighting material, such as sand, clay, talc, or any combination thereof adds to the mix. Then the polymer, also loaded with an extender such as talc, is added to the mix, coating all the sticky, tackifier 14-coated seeds 12.

Finally, yet another dusting of talc is added to absorb liquid, neutralize the tackiness of the tackifier 14, and otherwise terminate the tendency of the seed 12 to clump together. Further drying may then take place to dry the coated seed 12 to a desired degree to assure storage without residual clumping.

Before or after such drying, the seed 12 may optionally be made water proof or water resistant. This may be done by dusting or mixing the seed 12 with fumed silica. This step is completely optional, and is not used in many cases.

Before packaging, screening aids ultimate spreading by breaking up or removing large clumps of seeds 12 stuck together. Packaging will typically be in moisture-proof or highly moisture-resistant bags or other containers. Absorption of water can undo the controlled processes that coated the seed 12. Distribution can then be done by virtually any method. It has been found that less seed 12 per square foot or per acre is required. Distribution is more reliable and survival is more assured.

Example 5

In selected tests, coated seeds 12, in accordance with the invention showed that soluble nutrients may be added to the coating. Tests show that the hydrophilic polymers have ability to absorb, hold, and offer a controlled release of water soluble nutrients. In some circumstances, so long as the polymer has been applied to the soil or seeds 12, such that it is existing in the soil, it can also absorb and hold nutrients for later delivery to nearby plants.

Polymers 18 may thereby be used as carriers of fungicides, herbicides, fertilizers, and even insecticides that are water soluble. Whether farm land, garden, or lawn, polymers in accordance with the invention may be prepared with one or more of these additives in the polymer before coating. The additive may be dissolved in the water used to dilute the tackifier 14. Thus, a nutrient, protectant, or other chemical load may be designed and implemented into the coating directly or indirectly through the mix water in the tackifier 14.

Nutrients may include macronutrients, micronutrients, or both. Macronutrients typically include elements of, or compounds containing elements of, nitrogen, phosphorous, potassium, calcium, magnesium, sulfur, or a combination of two or more thereof. Nutrients can also be micronutrients. Micronutrients may typically include elements of, or compounds containing elements of, boron, chlorine, copper, iron, molybdenum, zinc, or a combination of two or more thereof.

Protectants may include various biocides or pathogenides. This may include one or more algicides, antifouling agents, antimicrobials, attractants, biopesticides, chemical pesticides, disinfectants and sanitizers, fungicides, fumigants, herbicides, insecticides, miticides (also called acaricides), microbial pesticides, molluscicides, nematicides, ovicides, pheromones, repellents, rodenticides, defoliants, desiccants, insect growth regulators, and plant growth regulators. Protectants may include any composition having, as an active ingredient, 2,4-D, Acephate, Acid Copper Chromate (ACC), Alkaline Copper Quaternary (ACQ), Arsenic or any arsenic containing compound, Bifenthrin, Bis-(N-cyclohexyldiazeniumdioxy)-copper (Cu-HDO), Boric Acid, Capsaicin, Chlorpyrifos, Chromated Copper Arsenate (CCA), Chromium or any chromium containing compound, Copper or any copper containing compound, Copper Azole (CA), Creosote, Cyproconazole, d-Phenothrin, DEET, Deltamethrin, Diazinon, Dicamba, Fipronil, Glyphosate, Imidacloprid, Malathion, Methoprene, Micronized Copper Wood Preservatives, Naphthalene, Neem Oil, Paradichlorobenzene, Pentachlorophenol, Permethrin, Picaridin, Propiconazole, Resmethrin, Zinc Phosphide, or Zinc Sulfate.

A seed coating 18 carrying the polymer 18 or an augmented polymer 18 loaded with nutritional or protection (e.g., insect, fungus, etc.) chemicals thereby absorbs and effectively captures the designed protectant or nutrient composition needed. As the seed 12 coating is sown with the seed 12 and eventually exposed to water, the chemical composition is released in a controlled manner.

Moreover, it has been determined that the chemicals dissolved in the water are held by the polymer in the coating, even after the coating has been separated by watering the ground, the growth of the seed, growth emergence, and so forth. It still controls (reduces) nutrient and chemical leaching that would otherwise typically occur more rapidly, and reduces waste that would result from other application processes.

For example, cotton seed 12 is susceptible to fungi. It needs to be pre-treated with a variety of fungicides. It is also benefitted by starter fertilizers. However fertilizer materials must be water soluble to be available to the plant as it emerges from the seed 12 and from the ground. Meanwhile, moisture, from the ground and ultimately from irrigation, is required to germinate the seeds 12. The same moisture needed for germination and growth may also tend to leach away the soluble nutrients and protectants, like fungicides.

Therefore, a composition, apparatus and method in accordance with the invention provide a coating, which itself can resist the leaching by holding the water in which such chemicals are dissolved. Moreover, the water-absorbing (hydrophilic) polymer in the seed 12 coating tends to soak up water, and with it the nutrients and fungicides from their location on the seed, from their inclusion in the polymer, from their application in the diluent water of the tackifier 14, or from their application in the soil or irrigation water.

Thus, in addition to holding several times the weight of a seed 12, and certainly many times the weight of the polymer 18 in the coating, the polymer particles 18 or granules 18 slow the leaching process, rendering the chemicals more effective for the seed 12.

Figure 5:
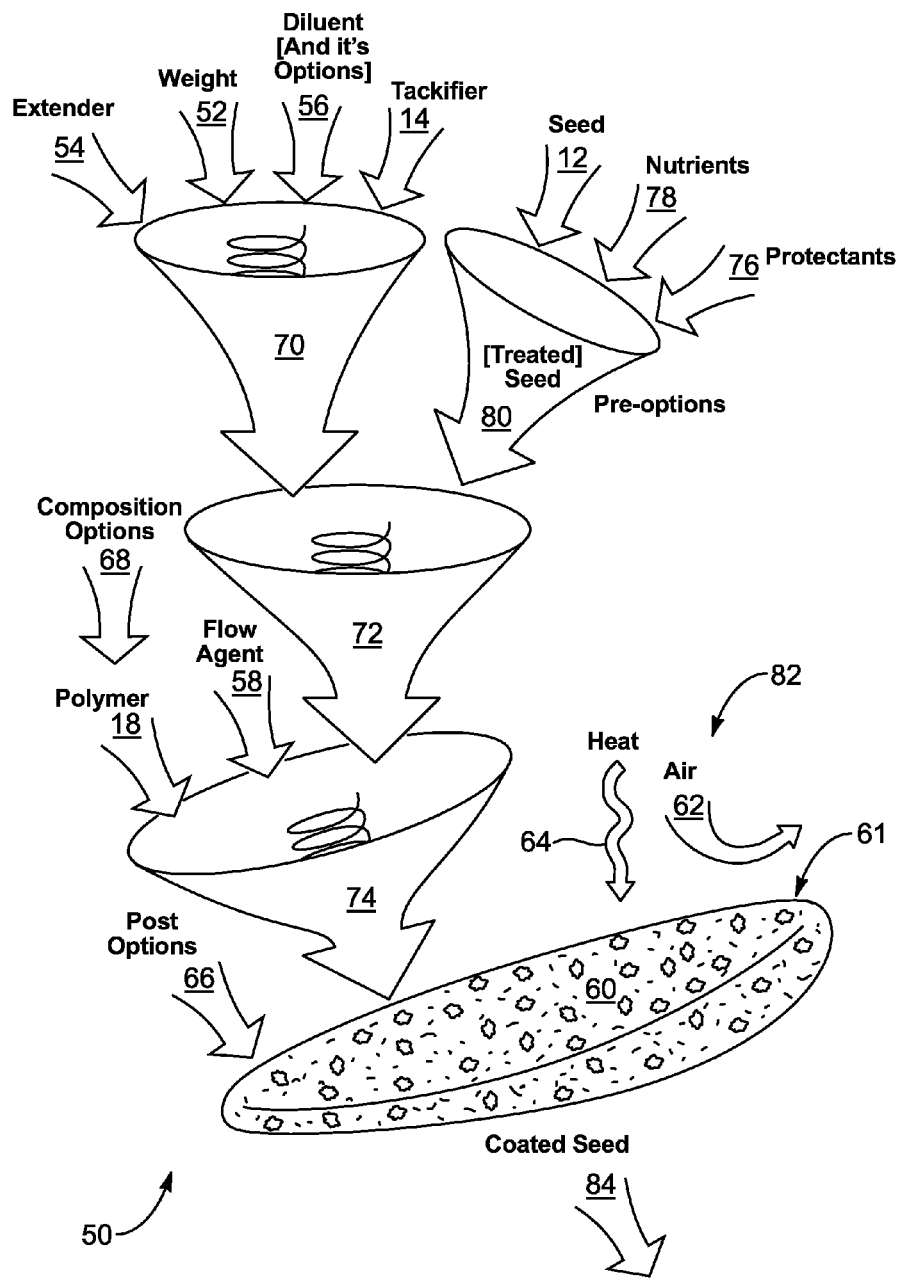
FIG. 5 is a schematic diagram of one embodiment of a coating process for seed as a delivery vehicle for a soil amendment in accordance with the invention.
Figure 6:
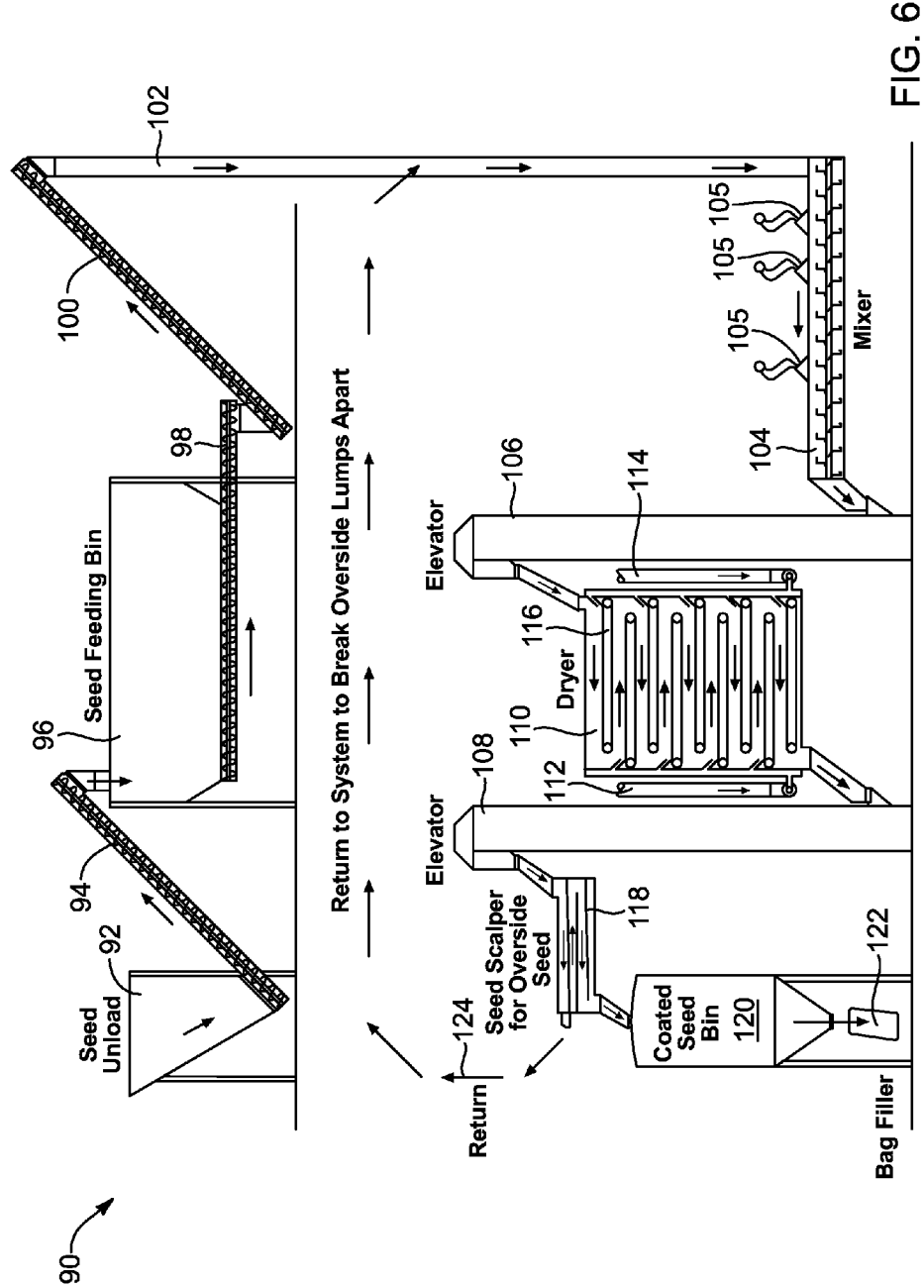
FIG. 6 is a schematic diagram of one embodiment of a processing plant and apparatus for adhering amendment materials to seed in accordance with the invention.

Referring to FIGS. 5 and 6, it has been found that valuable control for a process 50 of soil amendment is obtained by providing a processing plant 90 having continuously variable feed rates throughout to control processing times or dwell times of materials in the various stages of the process 50. This may be accomplished by a combination of motor controls driving bin augers 94, 98, 100, conveyors 94, 96, 89, 100, 102, 104 of various types, material applicators 105, mixers 104, and the like. In this way, materials, mixing, and properties may be tuned to exactly the amounts desired and engineered to provide the performance needed for a particular seed type.

Less important are the actual sizes, feed rates, amounts, and so forth than the ability to tune the process 50 for any set of mixers 104, conveyors 94, 98, 100, 102, 104, hoppers 92, 96, dryers 110, seeds 12, coatings 61, and so forth. Each process 50 and plant 90, even each device in such plant 90 and step in such process 50, needs to be capable of being calibrated for a particular seed type.

This implementation of calibration has been provided and operated successfully in a plant 90 operating in accordance with the foregoing processes 50 or methods 50. A wide range of parametric variation is therefore available in order to obtain the desired effect for any particular size, shape, weight, etc. of seed 12 processed in a seed coating plant 90.

Likewise, timing can be adjusted by rates of flow, speeds of conveyors and feeders, volumetric flow in cubic feet per minute of air discharged by fans, heating rates, and so forth. Thus, even variations for local climate may be considered and adjusted. Temperature, humidity, times, distances, and the like for a process may vary by climatic region. These may be adjusted for local environments, such as for example the humidity of the midwest or gulf coast compared to the aridity of deserts in the mountain west of the United States.

Referring to FIG. 5, in one embodiment of a method 50 in accordance with the invention, a tackifier 14 may be mixed in a process 70. The tackifer may be mixed with a weighting material 52, before, after, or during dilution by a diluent 56, such as, for example, water 56. Weight 52 may be clay powder 52 or particles 52, or possibly a suspension 52 already hydrated.

Meanwhile, an extender 54, such as talc, may be added to increase viscosity, add mass, further dilute the tackifer, reduce the amount of seed required, or the like. Talc is a green-to-gray, soft mineral known as hydrous magnesium silicate, $Mg_3(Si_4O_{10})(OH)_2$.

A mixer 70 or mixing process 70 may combine any or all the foregoing. All are options, except usually the tackifier, as described in coating processes hereinabove. Seed 12 may be added directly to a mixing process 72 with the output of the mixing process 70, with or without additions.

The polymer particles 18, possibly cut (diluted) with a flow agent 58 as a powder such as talc, may be added at multiple times to the overall mix. The flow agent 58 is optional, and may also be selected as the same material as that used for the extender 54, for which talc has proven suitable. A mixer 74 or mixing process 74 combines the output of the process 72, the seed 12 with an initial stage of a coating 61, presenting a tacky surface. The particles 18 of hydrophilic polymer 18 tends to embed in the tackifier 14. The flow agent 58, being a powder, having particles that are small, light, plate-like and very dry, tends to stay on the surface of the tackifier 14. Thus it tends to neutralize the tackifier, resisting agglomeration of the coated seeds 60.

A mixer 74 or mixing process 74 may be one or more processes 74. However, in certain embodiments, all the mixing processes 70, 72, 74, and 80 in the process 50 may simply be different stages or location in a single, long, continuous mixing process. That is, it has been found that a rod mixer having long, bent fingers that are L-shaped rods extending from a central, auger-like core, can mix and drive along the seed 12 while being coated. The various materials 12, 14, 18, 52, 54, 56, 58, 68, 66 may actually be delivered into the mixer 104 of the plant 90 at various stages therealong to implement the process 50. Ultimately the mixing process 74 at the output of the mixer 110 delivers the coated seed 60 for drying.

Drying may rely on an air flow 62 or air 62, a head flow 64 or heat 64, or both to remove any excess moisture, typically some of the water 56 used as a diluent 56 for the tackifier 14. Some of the diluent has already been absorbed by the polymer granules 18. That moisture may stay there, but may be dried back out in some circumstances.

In some embodiments post options 66 may be added, such as fumed silica 66, in order to enhance the properties of the coated seed 60. For example, fumed silica has been found to delay the incursion of surrounding water into seeds 12, and may be used for the purpose of allowing seeding with the coated seed in wetter ground without danger of rot or fungus. Other post options may be added as well or instead.

In some embodiments, composition options 68 may be added to the polymer 18, either within the polymer 18 as it is formulated, or thereafter. Later additions may include coating with materials such as protectants 76, nutrients 78, or both. Protectants may include one or more of insecticides, fungicides, or the like.

Likewise, just as optional extenders 54 may be added to the mixing process 70, protectants 76, nutrients 78, or both may be added to the mixing process 80 or pre-options process 80 before seed 12 is coated. For example, the process 80 is completely optional, but has been found useful. The existence of protectants 76, nutrients 78, or both, becomes even more useful once the polymer 18 is coating the seed 12. The polymer particles 18 tend to absorb and hold such materials 76, 78 in the absorbed water picked up by the coated seed 60 from its environment. The materials 76, 78 are delivered to the roots originating from the seed, along with the absorbed water.

Referring to FIG. 6, in one embodiment of an apparatus in accordance with the invention, a system 90 may include a hopper 92 or bin holding seed 12. An auger 94 or other conveyor 94 carries and passes the seed 12 to a feeding bin 96. An auger 98 or other conveyor 98 transports and passes the contents from the feeding bin to an auger 100, which discharges to a belt conveyor 102 directed to feed into the mixer 104. In the illustrated embodiment, the auger conveyor 100 lifts the substrate seed 12 to the conveyor 102, which then 1 lifts the seed 12 to a mixer 104, which may also be configured as a rod mixer 104 or "rod auger" 104.

The mixer 104 may also be thought of as a series of mixers 104. It may be implemented as several mixers 104, each dedicated to a single one of the mixing steps 70, 72, 74, 80 of the process 50. In the illustrated embodiment, the mixer 104 is implemented in a long tube into which feeders 105 introduce the materials 12, 14, 18, 52, 54, 56, 58, 66, 68, 76, 78 in the proper order as illustrated in FIG. 5. From one to five feeders 105 will work, and the exact number may be dictated by the effectiveness of the mixing and addition process steps 66, 70, 80, 72, 74, 80 in combination with the materials to be used in each.

Following completion of all the mixing steps 70, 72, 74, 80, and optional applications 66, 68 in order (or those selected, since almost all may be optional), the mixer 104 discharges the coated seed 60. The mixer may be from about 10 to about 50 feet long, and can usually provide all mixing steps 70, 72, 74, 80 in from about 15 to about 40 feet of length. One prototype was found to be completely controllable and effective with a distance of about 24 feet.

The coated seed 60 is discharged into an elevator 106 as a feeder into the dryer 110, where the seed is exposed to flows of air 62 and heat 64. Drying removes liquids, typically water, and thereby hardens the coating 61, and particularly the tackifier 14 in the coating 61 on the seed 12. An output elevator 108 acts as for continuous removal of the contents of the dryer 110 as the coated seed 60 comes to the end of the dryer 110.

The dryer 110 includes at least one plenum 112, 114 to feed hot air into the dryer 110, thus drying out any undesirable amount of moisture that may remain in the coated seed. A series of conveyors 116 exposes the coated seed 60 to a drying process 82 controlling flows of air 62 and heat 64 to effect drying 82 to the level specified and so controlled. In the illustrated embodiment, the conveyors 116 may be arranged in a tower, each conveyor 116 receiving its charge from the conveyor 116 above it, and discharging its contents to a conveyor 116 therebelow.

A total length of from about 100 to about 300 feet is contemplated, and a prototype plant 90 having a total length of 240 feet of conveyors provided adequate dwell times for drying. However, the amount of air 62 and heat 64 is inversely proportional to the length of the drying conveyors 116, and both may be engineered to optimize the dryer 110 and drying process 82.

A sorter 118, such as a scalper 118 or the like receives the discharge of the elevator 108, and sorts that output for oversized material indicating clumped or agglomerated seeds. Debris and poorly attached ingredients may be blown away from the coated seeds 60. In certain embodiments, blowers may be used as sorters, relying on the balance of fluid drag against the weight of gravity to distinguish sizes of particles and separate them.

Ultimately, a storage bin receives all the coated seed 60 for storage until it can be put into packaging 122 for distribution. The packaging 122 may be moisture proof in order to avoid absorption of moisture by the coated seed.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method of soil amendment, the method comprising:
   providing a substrate of a first material in discreet granules, separate from one another;
   coating each of the granules with a fluid operating as a binder;
   providing a soil amendment formed as a powder, dry and adherent to the substrate with the binder through adhesion binding;
   securing to at least a portion of the binder already on each of the granules a quantity of the powder;
   distributing the granules dry and with the powder adhered thereto and exposed to the surrounding environment in a soil bed; and
   releasing, by the binder, the soil amendment into the soil proximate the granules.

2. The method of claim 1, wherein the granules are selected from sand, seeds, fertilizer, gravel, and a constituent of soils.

3. The method of claim 2, wherein distributing further comprises delivering the granules into contact with the soil by at least one of:
   drilling;
   broadcasting;
   mixing;
   furrowing;
   layering; and
   burying.

4. The method of claim 3, wherein releasing is effected in response to hydration of the powder by water received from the soil bed.

5. The method of claim 4, wherein the soil amendment is a second material distinct from the first material and comprising a polymer.

6. The method of claim 5, further comprising embedding at least one of a protectant and a pathogencide in at least one of the binder and the powder.

7. The method of claim 5, further comprising embedding at least one of a protectant and a pathogencide in the powder by dissolving in a solvent absorbed by the polymer.

8. The method of claim 7, further comprising comminuting the polymer to the powder after evaporating a majority of the solvent.

9. The method of claim 8, wherein the solvent is water.

10. The method of claim 9, wherein the polymer comprises polyacrylamide.

11. A method for amending soil, the method comprising:
providing a seed as a carrier;
selecting an absorber formed as a powder, dry, hydrophilic, comminuted to powder, and distinct from the carrier and the soil;
selecting a binder, as a fluid adhering the powder adhesively to the carrier;
coating the seed with the binder;
adhering, by the binder already coated on the seed, the powder to the seed, individually and separately;
rendering the seed individually non-adhering by drying the binder;
placing the seed in contact with the soil individually; and
separating, by the powder, from the seed into the soil.

12. The method of claim 11, wherein the seed is selected from agricultural seed, flower seed, fruit seed, vegetable seed, and grass seed.

13. The method of claim 11, wherein distributing further comprises delivering the seed into contact with the soil by at least one of:
drilling;
broadcasting;
mixing;
furrowing;
layering; and
burying.

14. The method of claim 11, wherein releasing is effected in response to hydration of the powder by water received from the soil.

15. The method of claim 11, wherein absorber is an amendment modifying a characteristic of the soil.

16. The method of claim 11, wherein the absorber comprises a polymer.

17. The method of claim 11, further comprising embedding at least one of a protectant and a pathogencide in at least one of the binder and the powder.

18. The method of claim 11, further comprising:
embedding at least one of a protectant and a pathogencide in the powder by dissolving it in a solvent and absorbing the resulting solution into the absorber; and
evaporating at least a portion of the solvent from the absorber.

19. The method of claim 18, wherein:
the solvent is water;
the absorber is a polymer comprising polyacrylamide.

* * * * *